Patented July 24, 1928.

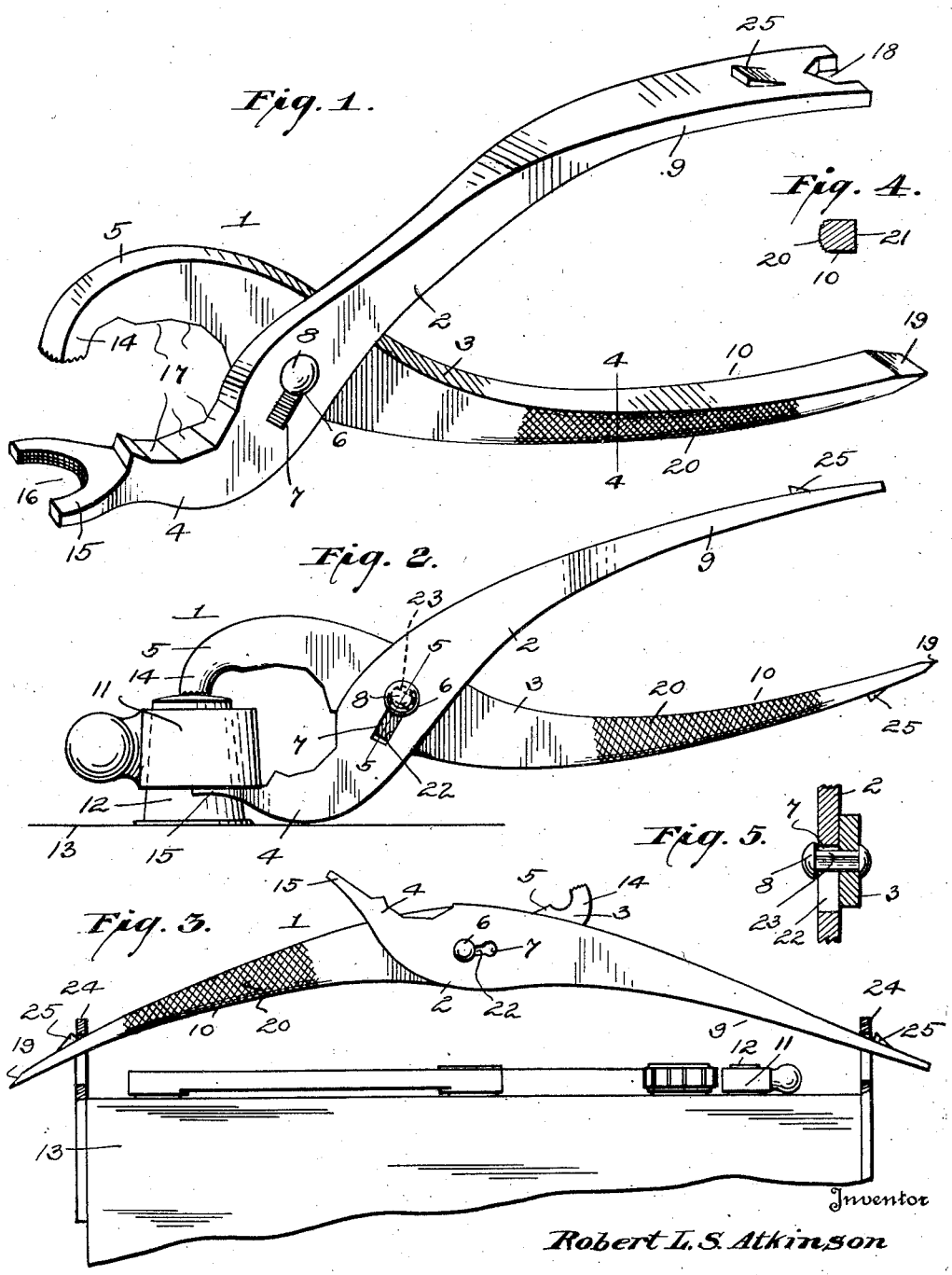

1,678,313

UNITED STATES PATENT OFFICE.

ROBERT L. S. ATKINSON, OF COLUMBUS, OHIO.

BATTERY TOOL.

Application filed July 31, 1925. Serial No. 47,301.

This invention relates to an improved combination tool adapted for use primarily by storage battery attendants for the purpose of facilitating the removal of storage batteries from or the insertion thereof in motor vehicles and also to facilitate the method of connecting or disconnecting conductor clamps and fastening devices with the terminal posts or members of a storage battery.

The principal object of the invention resides in the provision of a single tool constructed to include combinations of features and elements whereby through the use of the tool a battery worker will be provided with all necessary mechanical means for installing or removing a storage battery in operative relation to a motor vehicle.

A storage battery, of the type used in connection with the starting and lighting systems of motor vehicles, presents considerable difficulties to the battery attendant in the matter of removing or inserting the battery from or into the battery carrier of a motor vehicle and in connecting or disconnecting the electrical conductors with the terminal posts of said battery. In the first place it is difficult, because of the inaccessibility of the battery and its weight to lift a battery manually into or out of its carrier. Second, the conductor clamps become corroded upon the terminal posts and are difficult to remove and clean. Also, the fastening bolts and nuts, which are used to tighten the clamps in place frequently must be removed while the battery is in place within its carrier. To accomplish these several operations, and others, a battery worker has been provided usually with a number of tools consisting of pliers, wrenches, screw drivers and lifting handles to perform the several operations. These tools are apt to be misplaced, or lost, take up considerable room and the worker's time is frequently lost by looking around for the desired tool necessary for certain operations, and therefore, to overcome these conditions the present invention consists in the provision of a single tool wherein is combined all the necessary members and implements hitherto separately used so that a worker, when provided with a tool comprising the present invention, will be at all times ready to carry out the several operations necessary in battery maintenance, and the disadvantages in carrying a number of separately used tools will be eliminated.

For a further understanding of the invention, reference is to be had to the accompanying drawing, in which:

Figure 1 is a perspective view of the battery tool comprising the present invention, Figure 2 is a side elevation thereof, illustrating the tool in position to effect the removal of a conductor clamp from the post of a storage battery, Figure 3 is a side elevation showing the tool in position to serve as a lifting handle for the purpose of carrying a battery, Figure 4 is a cross-section on the line 4—4 of Figure 1, Figure 5 is a similar view on the line 5—5 of Figure 2.

Referring more particularly to the drawings the numeral 1 designates my improved battery tool in its entirety. This tool is in the general form of a pair of pliers and consists of a pair of complemental pivotally united members 2 and 3. The forward ends of the members 2 and 3 include jaws 4 and 5 respectively and the said members at their point of intersection are pivotally united for relative swinging movement by means of a stud 6, that projects from the member 3 and is received within the slotted opening 7 provided in the member 2, the outer end of the stud being headed as at 8. Beyond the stud 6 the members 2 and 3 are curved to provide gripping arms 9 and 10, which may be operated in the manner of ordinary pliers to control the opening and closing of the jaws 4 and 5. One of the principal uses of the tool is to remove a conductor clamp, such as is indicated at 11 from the terminal post 12 of a battery 13. These clamps become corroded frequently upon the posts and their removal is quite a difficult matter to accomplish without injurying or breaking the posts or otherwise harming the battery. To permit this operation to be quickly and safely done, the jaw 5 has its forward end 14 shaped so as to rest upon the upper surface of the post. To stabilize the jaw in this position its under surface is roughened or scored so as to enhance its grip in relation to the post. The lower jaw 4 is provided with a forwardly projecting relatively flat extension 15, having an arcuate recess 16 provided therein shaped to embrace the cylindrical form of the post and to engage the under part of the clamp 11 as shown in Figure 2. It will be seen by pressing the arms 9 and 10 together, relative approach between the jaws 4 and 5 will be effected so as to raise the clamp 11. This action results in imparting a straight upwardly directed vertical movement to the clamp, avoiding placing lateral strains and stresses upon the post, which is now customary, to the end of eliminating the possibility of damaging the plate or post construction proper of the battery. By the provision of the tool a very considerable leverage can be exercised upon the clamp so that the latter may be removed from the post irrespective of the corroded and adhering conditions present.

After the clamp has been removed from the post it is frequency found that there is a sulphate deposit on the post itself. In order to secure a proper electrical contact it is advisable to remove this deposit, and for this reason the walls of the recess 16 are toothed or scored so as to present a file like surface. Then, by placing the upper jaw 5 upon the post and by moving the vertical jaw up and down relative to said post the exterior surfaces of the post may be filed by the rubbing action of the extension 15 so as to remove the deposit, whereby when the clamp is subsequently replaced an efficient electrical contact between the clamp and post will be provided.

The inner opposed surfaces of the jaws 4 and 5 are provided with polygonal, multiplane surfaces 17 arranged in angular relation around the inner edges of said jaws. By the provision of the surfaces 17 the jaws are enabled to assume positions to obtain a multiplicity of wrench positions. This construction adapts the tool to the size of the vent caps employed in connection with the different cells of the battery, and enables the tool to obtain a correct and effective grip upon such caps to remove the latter when the same stick in connection with their threads. Also the jaws may be employed to remove or tighten other nuts or binding members found in connection with battery constructions, such for example as the nuts used in binding the holding rods of a battery to the carrier frame or in certain style terminal binding members.

The outer end of the arm 9 is formed in this instance with a nut receiving socket 18 which is used preferably for tightening or removing the terminal clamping nuts from the clamps 11. These nuts are employed to control the frictional securing relation existing between the clamps and the posts 12. The free end of the arm 10 is provided with a sharpened extremity 19 which may serve in the capacity of a screw driver, which may be employed for loosening terminal screws or for removing vehicle floor boards and the like. Also, the arm 10 is provided on one side with an arcuate or round file 20 and on its opposite side or edge with a straight file 21. These files may be employed for removing sulphate deposit or corrosion from the inner faces of the clamps 11.

Another important feature of the invention resides in the use of a tool as a handle for facilitating the lifting and manipulation of the battery. When used in this capacity the tool is open to assume the position disclosed in Figure 3, wherein the handles 9 and 10 are spread apart to their fullest possible extent. The tool is then locked in this position by sliding the member 2 so that the squared end 22 of the slot 7 will receive the squared portion 23 of the shank of the stud 6. When thus positioned the members 23 are locked against pivotal movement. The arms 9 and 10 have their outer ends inserted in the openings provided in the lifting handles 24 of the battery case, and if desired the said arms are provided with out-standing lugs 25, which serve to engage the handles 24 and prevent slipping of the battery when suspended from the tool. It will be seen that when the tool is thus associated with the battery the same may be manually grasped and an ample, comfortable and secure handle will be provided for effecting the lifting and bodily movement of the battery.

In view of the foregoing description, taken in connection with the drawing it will be seen that the present invention provides in a single tool all of the necessary mechanical adjuncts which a battery worker requires in taking care of his storage battery. The different tools are associated as a unit and are instantly available whenever required by the worker. Moreover, the tool itself is of novel construction and embodies instrumentalities for performing functions in connection with storage batteries not capable of being conveniently carried out by tools of ordinary design, among which are the means for facilitating the removal of an adhering terminal clamp from a post, second the provision of a single tool having permanent adjustments for fitting all the threaded nut or cap members provided in connection with a storage battery, and third, the provision of a collapsible easily carried battery lifter or handle.

While I have described the invention specifically in respect to the details of design of the tool comprising the preferred form of the invention, nevertheless it will be understood that the invention is capable and may be changed in various minor details of construction without departing from the principles of the invention as set forth in the following claims.

What is claimed is:

1. A battery tool comprising a plier shaped body including a pair of handle members pivotally connected at their point of intersection, means for locking said members against pivotal movement when said members occupy substantially a fully open position, and means on the outer ends of said members providing for the suspension of a battery case therefrom.

2. A battery tool comprising a plier shaped body consisting of a pair of members pivotally connected at their points of intersection, said pivotal connection consisting of a stud carried by one of said members and provided with a multi-sided shank, the other of said members being formed with a slotted opening arranged to receive said shank, and said shank when in one end of said opening permitting of the pivotal movement of said members and when in the other end of said opening serving to lock said members against pivotal movement, and means formed with the outer ends of said members for suspending a battery case therefrom.

In testimony whereof I affix my signature.

ROBERT L. S. ATKINSON.